(12) United States Patent (10) Patent No.: US 6,488,157 B2
Chen (45) Date of Patent: Dec. 3, 2002

(54) STAND FOR SUPPORTING A MOTORCYCLE

(76) Inventor: Geng-He Chen, No. 86, Ching-Kuo Rd., Ta-Chia Chen, Taichung Hsien (TW)

( * ) Notice: Subject to any disclaimer, the term of this patent is extended or adjusted under 35 U.S.C. 154(b) by 0 days.

(21) Appl. No.: 09/844,622

(22) Filed: Apr. 27, 2001

(65) Prior Publication Data

US 2002/0117459 A1 Aug. 29, 2002

(51) Int. Cl.$^7$ .................................................. A41F 5/00
(52) U.S. Cl. ............................ 211/20; 211/22; 254/131
(58) Field of Search .................... 211/20, 22; 254/129, 254/131, 134

(56) References Cited

U.S. PATENT DOCUMENTS

| 518,325 | A | * | 4/1894 | Mueller | |
|---|---|---|---|---|---|
| 3,667,728 | A | * | 6/1972 | Garelick | |
| 4,113,235 | A | * | 9/1978 | Hartman | 254/131 |
| 4,180,253 | A | * | 12/1979 | Ivens et al. | 211/22 X |
| 4,193,582 | A | * | 3/1980 | Neilson | 254/131 |
| 4,348,010 | A | * | 9/1982 | Baxter | 254/131 |
| 5,232,203 | A | * | 8/1993 | Butts | 254/131 X |
| 5,971,360 | A | * | 10/1999 | Sinsley | 254/131 |
| 6,341,763 | B1 | * | 1/2002 | Lefebvre | 254/131 |

OTHER PUBLICATIONS

Workstand.com, Stand Info, pp. 1–2, undated anderson-stand.com, Anderson Stands, 3 pages, Undated mm33ys.com, Rear Work Stand, pp. 1 and 4, 2000–2001 Cyclemalluser.com, Forklift Front Stand, p. 1, Aug. 1998.*

* cited by examiner

Primary Examiner—Robert W Gibson, Jr.
(74) Attorney, Agent, or Firm—Ostrolenk, Faber, Gerb & Soffen

(57) ABSTRACT

A stand includes a leverage base, two vertical rods, and a wheel supporting unit that is attached to the vertical rods and that is adapted to support a wheel thereon. The base has two fixed posts, which have upper ends that are connected respectively and telescopically to the vertical rods. The vertical rods are locked releaseably on the posts, thereby permitting adjustment of the heights of the supporting unit and the wheel.

6 Claims, 10 Drawing Sheets

STAND FOR SUPPORTING A MOTORCYCLE

BACKGROUND OF THE INVENTION

1. Field of the Invention

This invention relates to a stand for a motorcycle, more particularly to a stand, which can support a wheel of a motorcycle at different heights.

2. Description of the Related Art

When one intends to fix a motorcycle, it is necessary to position the same relative to the ground. In some cases, for convenience during maintenance and repair, one wheel of the motorcycle is preferably raised from the ground at an appropriate height. Hence, a known stand, which includes a handle and a wheel supporting unit that are fixed on a leverage base, has been proposed heretofore to support one wheel of a motorcycle at a predetermined height and therefore position the same relative to the ground. However, because the raised height of the wheel is fixed, the known stand is not suitable for working with different types of wheels.

SUMMARY OF THE INVENTION

It is an object of this invention to provide an adjustable stand, which can support one wheel of a motorcycle at different heights.

According to this invention, a stand includes a leverage base, two vertical rods, and a wheel supporting unit that is attached to the vertical rods and that is adapted to support a wheel thereon. The base has two fixed posts, which have upper ends that are connected respectively and telescopically to the vertical rods. The vertical rods are locked releaseably on the posts, thereby permitting adjustment of the heights of the supporting unit and the wheel.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
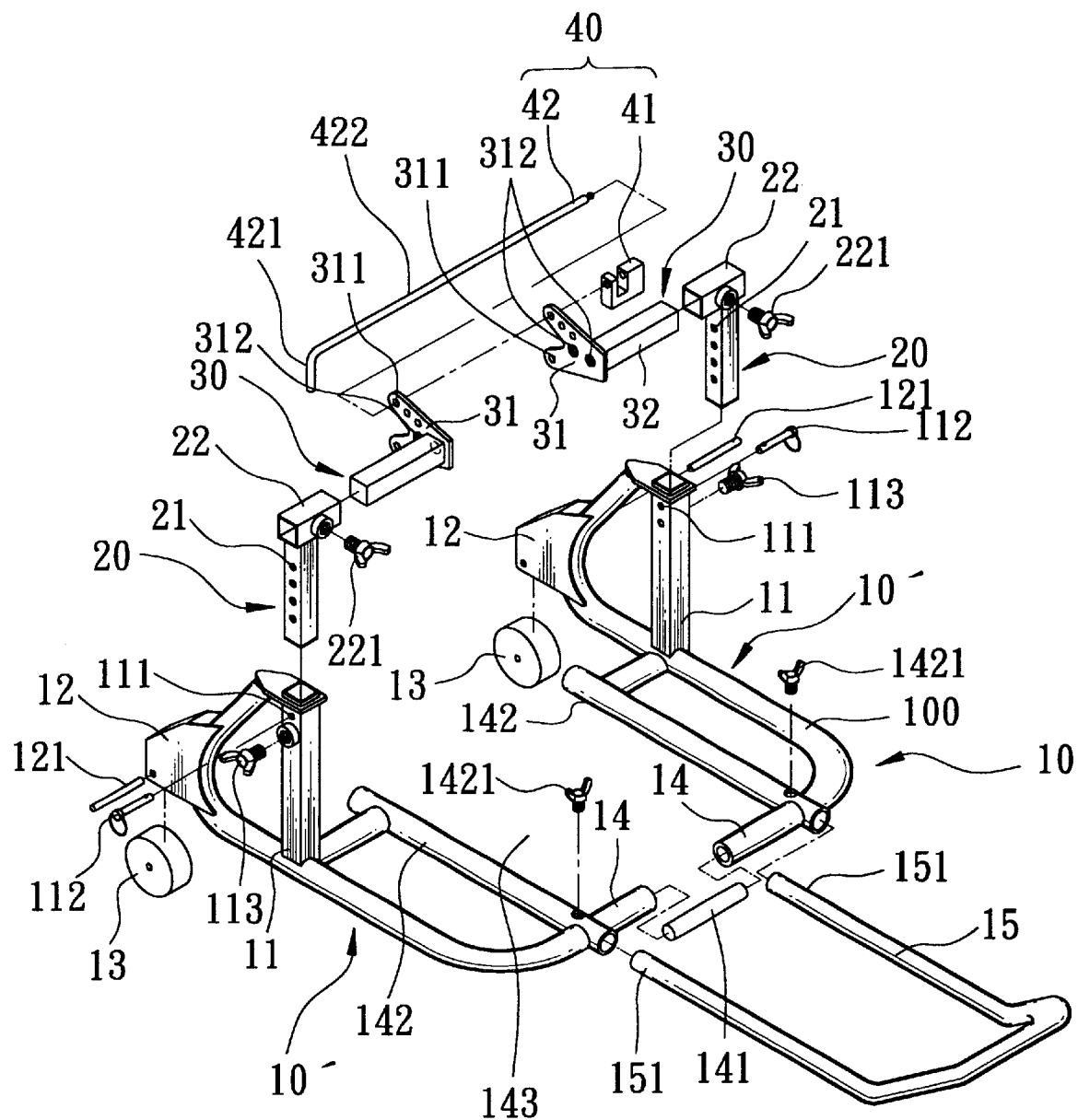
FIG. 1 is an exploded view of a first preferred embodiment of a motorcycle stand according to this invention.
Figure 2:
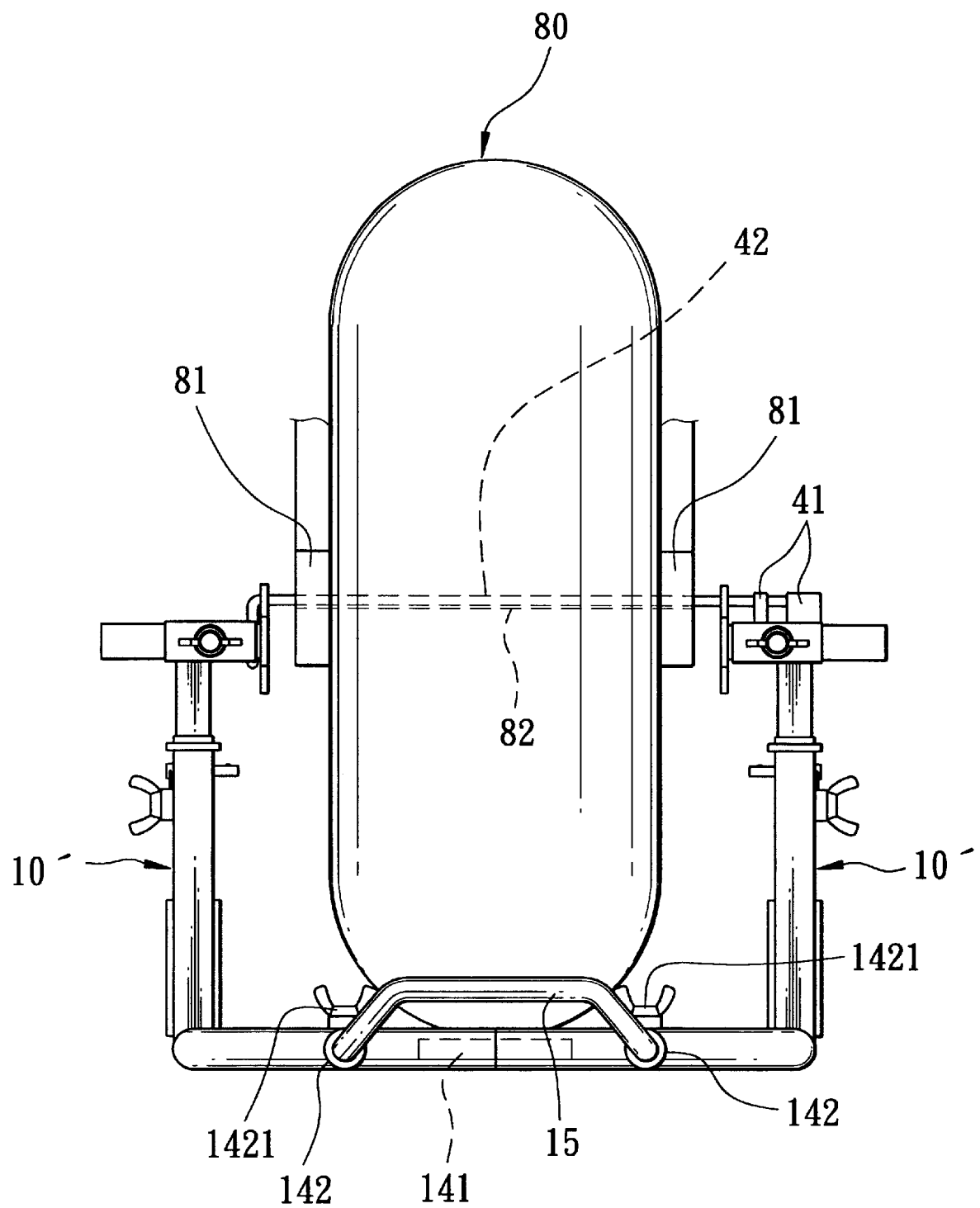
FIG. 2 is a schematic front view of the first preferred embodiment.
Figure 3:
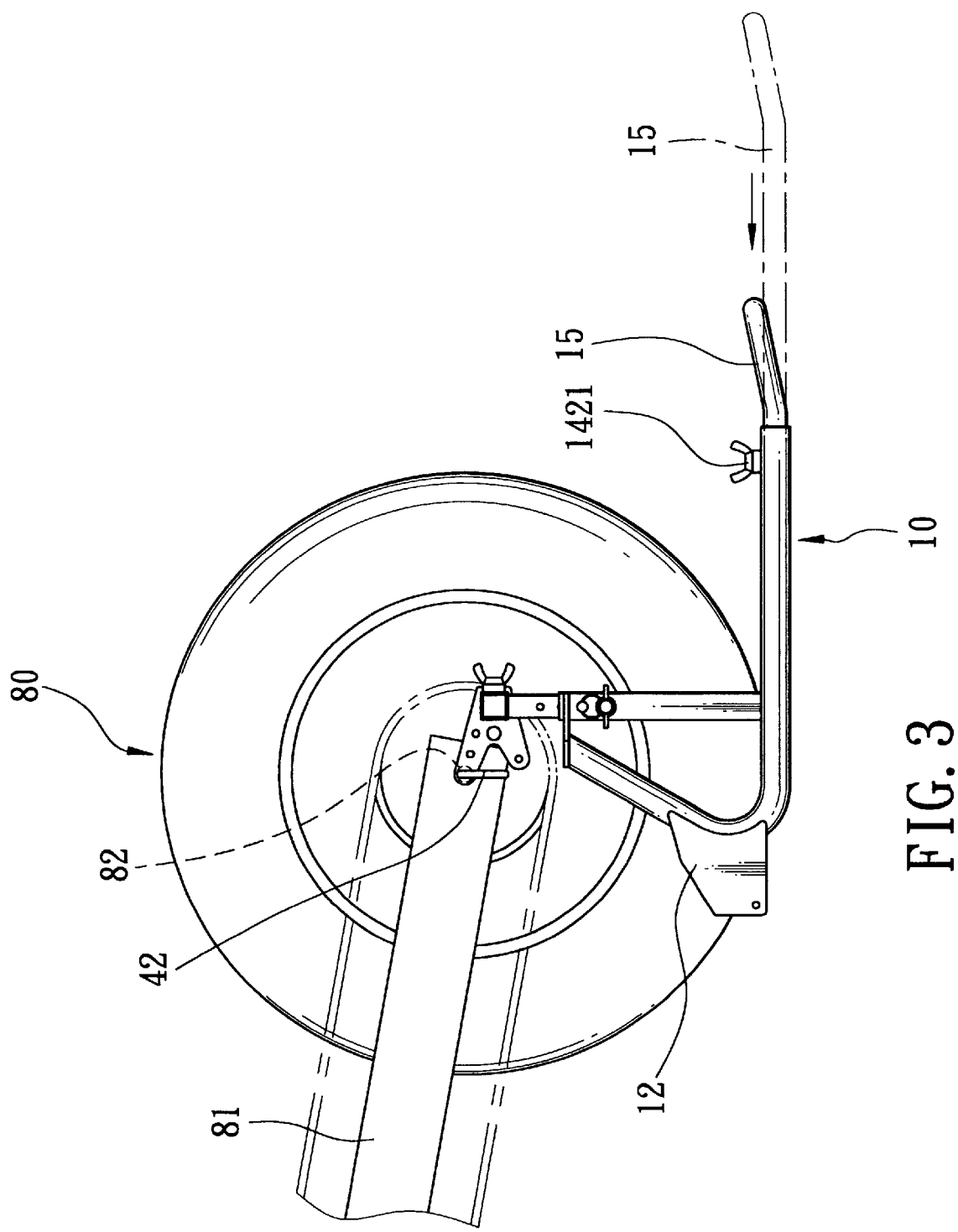
FIG. 3 is a schematic side view of the first preferred embodiment.

Referring to FIGS. 1, 2, and 3, a first preferred embodiment of a stand according to this invention is shown to include a non-replaceable assembly 10, and a first replaceable assembly that consists of two aligned vertical rods 20, and a wheel supporting unit. The supporting unit includes two transverse rails 30 and a lock unit 40, and is adapted to support a rear wheel 80 of a motorcycle, which is mounted on two arms 81 of a motorcycle frame.

The non-replaceable assembly 10 includes a leverage base consisting of a pair of left and right frame units 10', each of which includes an annular horizontal bottom frame 100, a post 11 fixed on the bottom frame 100, a caster seat 12 fixed to a front end of the bottom frame 100, a fulcrum caster 13 mounted rotatably on the caster seat 12 by means of a pin 121, and a transverse tube 14 fixed to a rear end of the bottom frame 100. An insert rod 141 has two ends, which are press fitted within the tubes 14. Each of the bottom frames 100 further has an integral longitudinal tube 142. Two tubes 151 of a handle 15 are connected respectively and telescopically to rear ends of the longitudinal tubes 142, and are locked on the same by means of two lock bolts 1421.

The vertical rods 20 are disposed respectively and telescopically on upper ends of the posts 11. Each of the vertical rods 20 is formed with a vertical row of positioning hole units 21 therethrough. Each of the posts 11 is formed with a pin hole unit 111 therethrough. Each of two positioning pins 112 extends through the respective pin hole unit 111 and a selected one of the positioning hole units 21 in the respective vertical rod 20. The vertical rods 20 are locked on the posts 11 by means of two lock bolts 113. Each of the vertical rods 20 is formed with an integral horizontal tube 22 at an upper end thereof.

The rails 30 are disposed respectively and telescopically within inner ends of the horizontal tubes 22, and are locked on the same by means of two lock bolts 221. Each of the rails 30 has a fixed vertical plate 31 that is formed with a horizontal row of three upper rod holes 311, and a lower rod hole 311. The plates 31 flank the wheel 80.

The lock unit 40 consists of a locking head 41 and a lock rod 42. The lock rod 42 has a vertical rod portion 421 and a horizontal rod portion 422, which is formed integrally with the vertical rod portion 421 and which is adapted to extend through two of the rod holes 133 in the vertical plates 311 and a horizontal hole unit 82 (see FIG. 2) in the assembly of the arms. 81 and the rear wheel, thereby supporting the rear wheel 80 on the lock rod 42.

The locking head 41 is locked releaseably on the horizontal rod portion 422 of the lock rod 42 by means of a key (not shown) so as to confine the arms 81, the rear wheel 80, and the vertical plates 31 between the locking head 41 and the vertical rod portion 421 of the lock rod 42.

Figure 4:
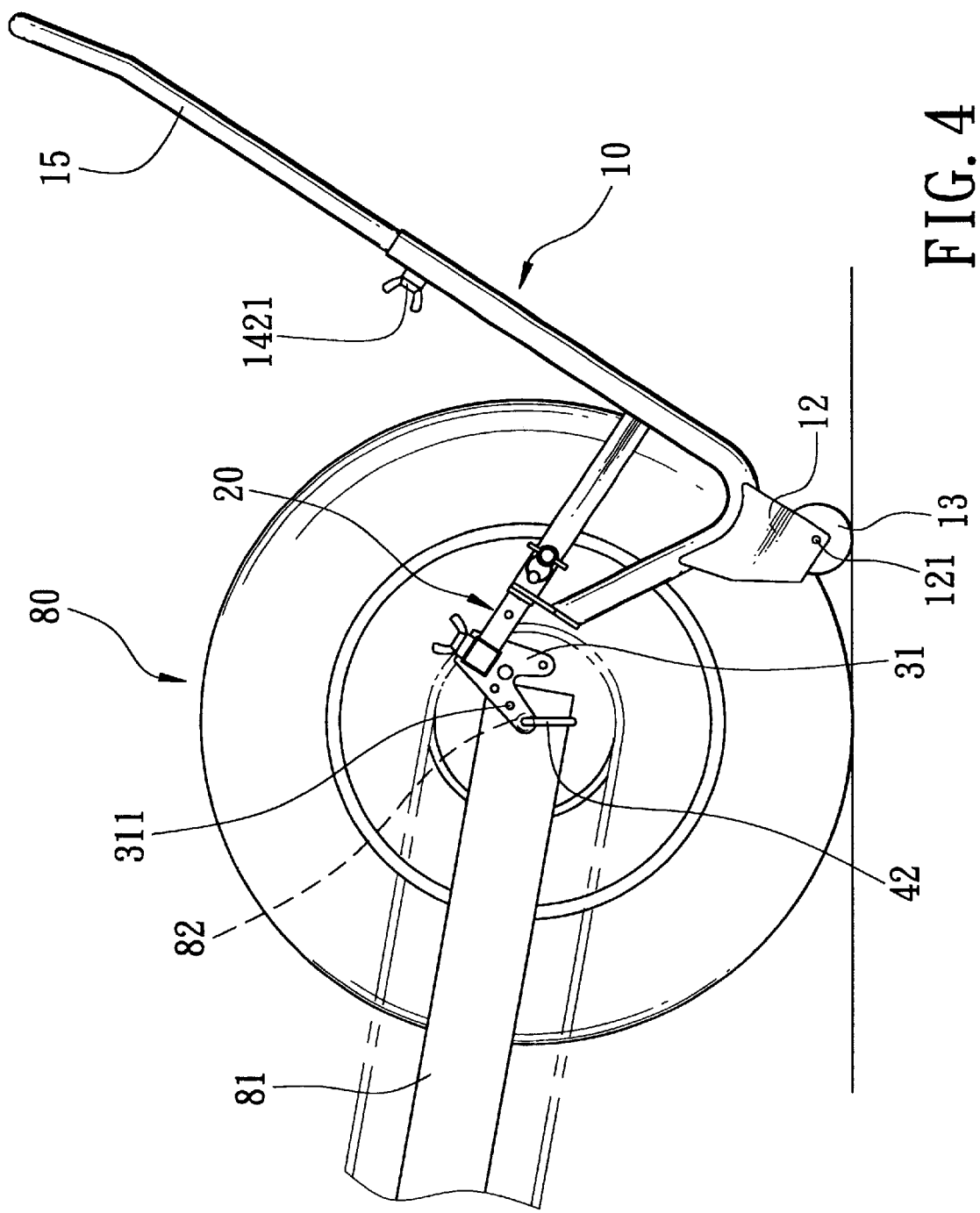
FIG. 4 is a schematic side view of the first preferred embodiment, illustrating how a rear wheel of a motorcycle is lifted by the stand.

Referring to FIG. 4, when it is desired to mount the stand under the wheel 80, the handle 15 is held, and is rotated about the casters 13. Referring to FIGS. 1 and 2, the tubes 142 define a wheel-passing space 143 therebetween, which is slightly wider than the wheel 80 so as to guide the movement of the rear wheel 80 between the frame units 10' during the mounting of the stand.

Figure 5:
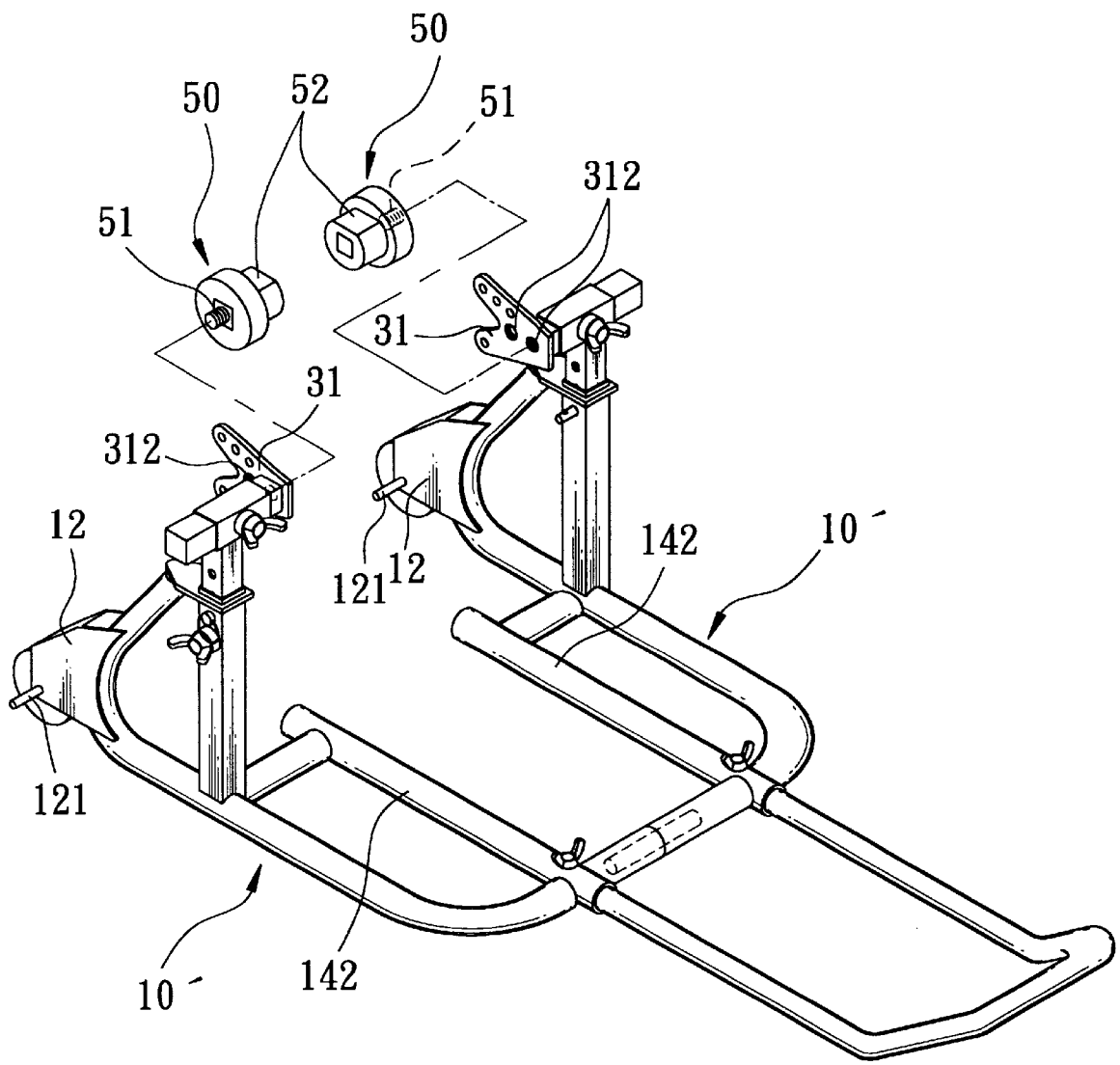
FIG. 5 is an exploded view of a second preferred embodiment of a stand according to this invention.
Figure 6:
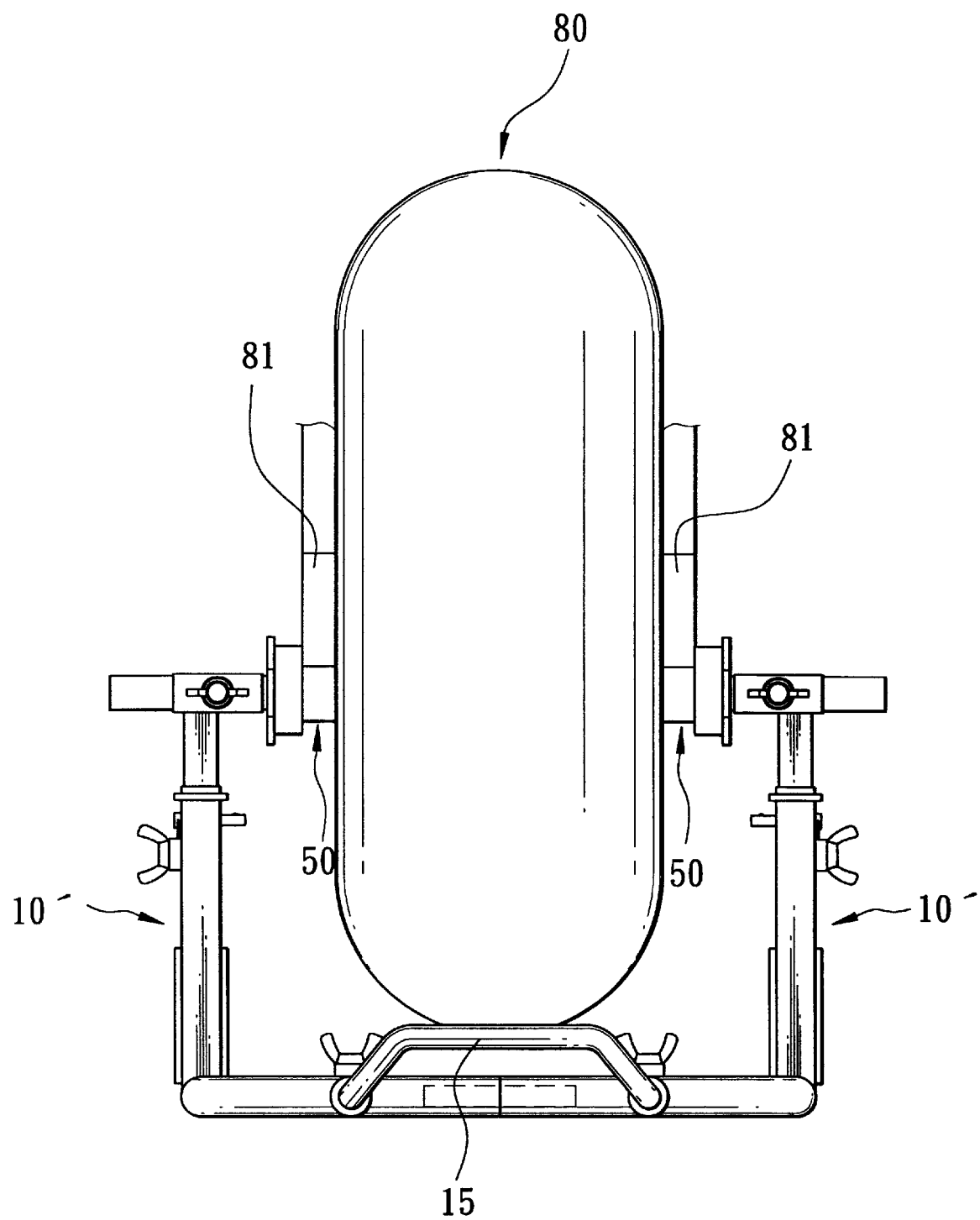
FIG. 6 is a schematic front view of the second preferred embodiment.

Referring to FIGS. 1, 5 and 6, in a second preferred embodiment of the stand of this invention, each of the vertical plates 31 further has two threaded holes 312. The lock unit 40 can be replaced with two plastic supporting members 50. Each of the supporting members 50 includes a fixed threaded rod 51 that engages one of the threaded holes 312 in the respective vertical plate 31, and a supporting portion 52 that supports the respective arm 81 and that presses against the rear wheel 80, thereby clamping the rear wheel 80 between the supporting members 50.

Figure 7:
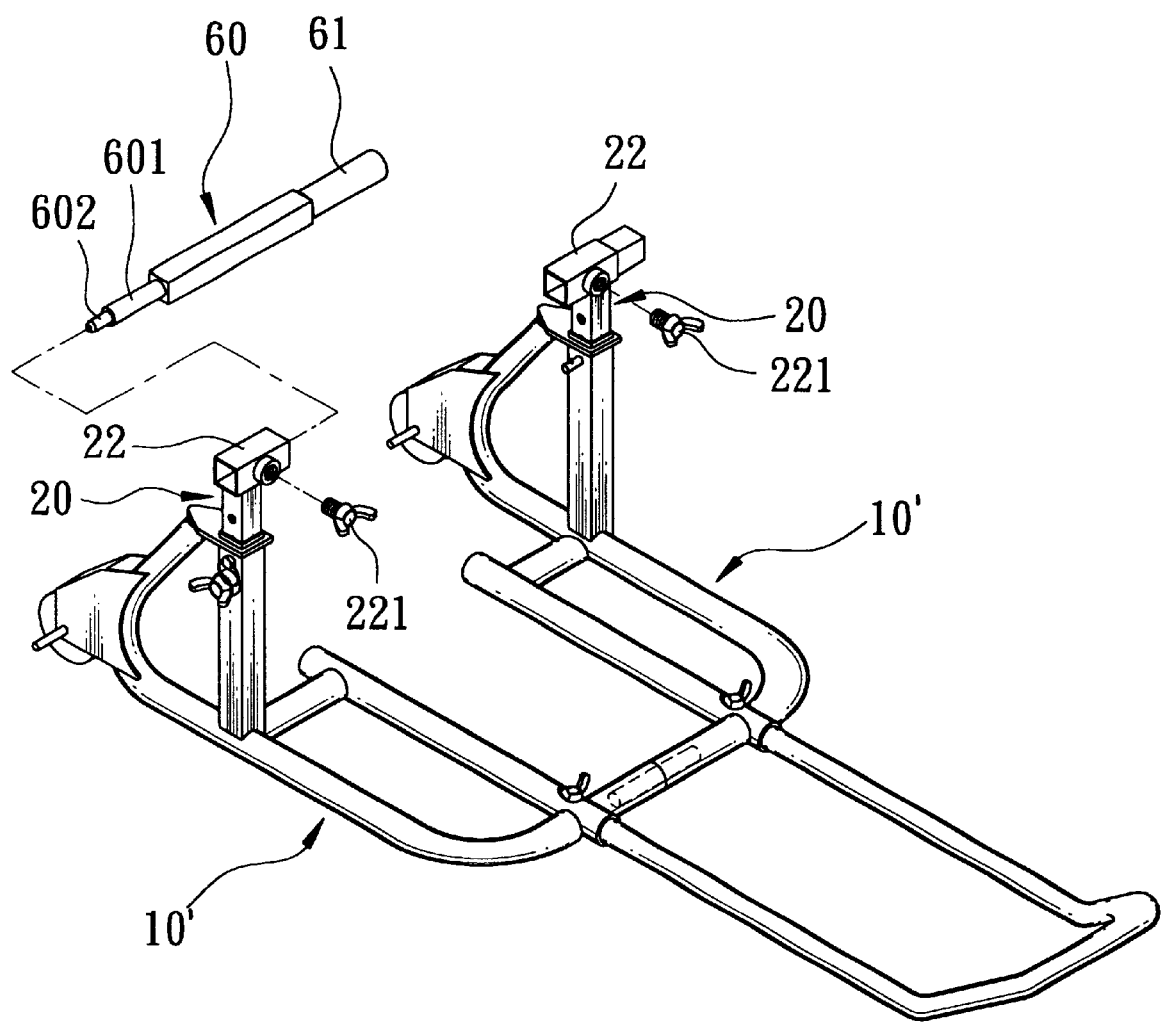
FIG. 7 is an exploded view of a third preferred embodiment of a stand according to this invention.

FIG. 7 illustrates another supporting unit, which includes a transverse supporting rod 60 that substitutes for the rails 30 (see FIG. 1) and the lock unit 40 (see FIG. 1) of the first preferred embodiment. The rod 60 has two narrowed end portions 601, and two distal ends 602 that are locked releaseably within the horizontal tubes 22. Two plastic tubes 61 are sleeved fixedly on the narrowed end portions 601 of the supporting rod 61, and are adapted to support the arms 81 (see FIG. 2) thereon.

Figure 8:
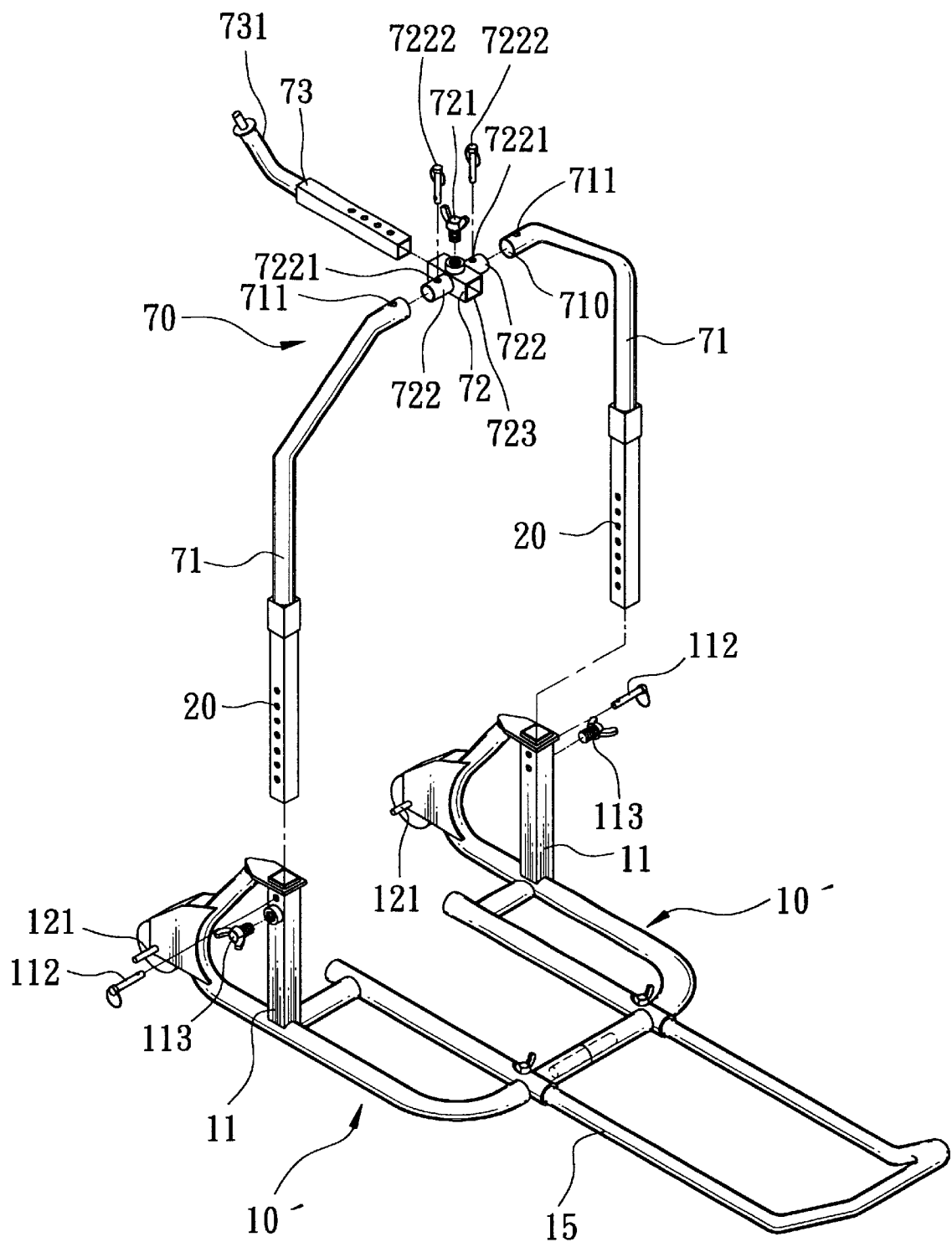
FIG. 8 is an exploded view of a fourth preferred embodiment of a stand according to this invention.
Figure 9:
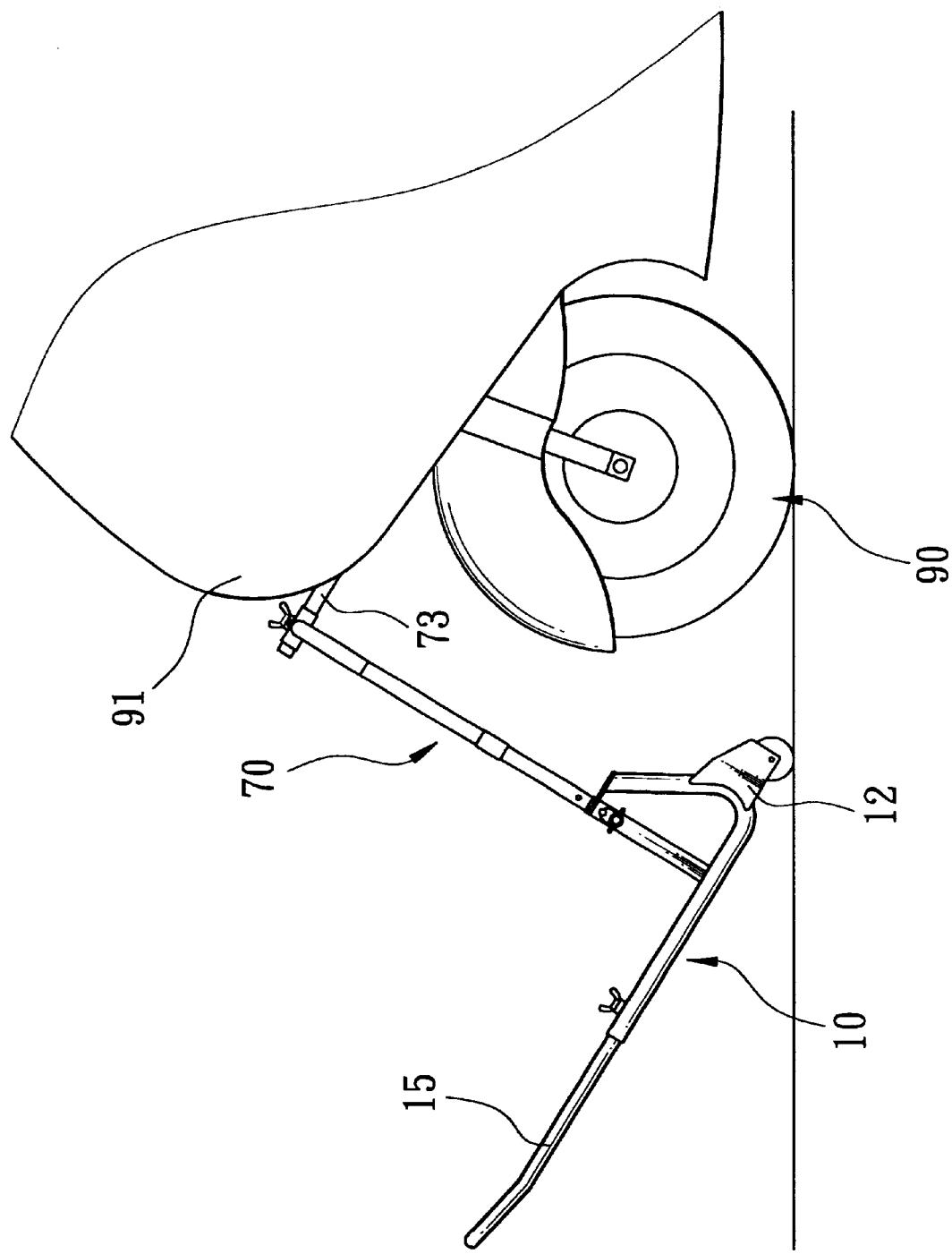
FIG. 9 is a schematic side view of the fourth preferred embodiment, illustrating how a front wheel of a motorcycle is lifted by the stand.
Figure 10:
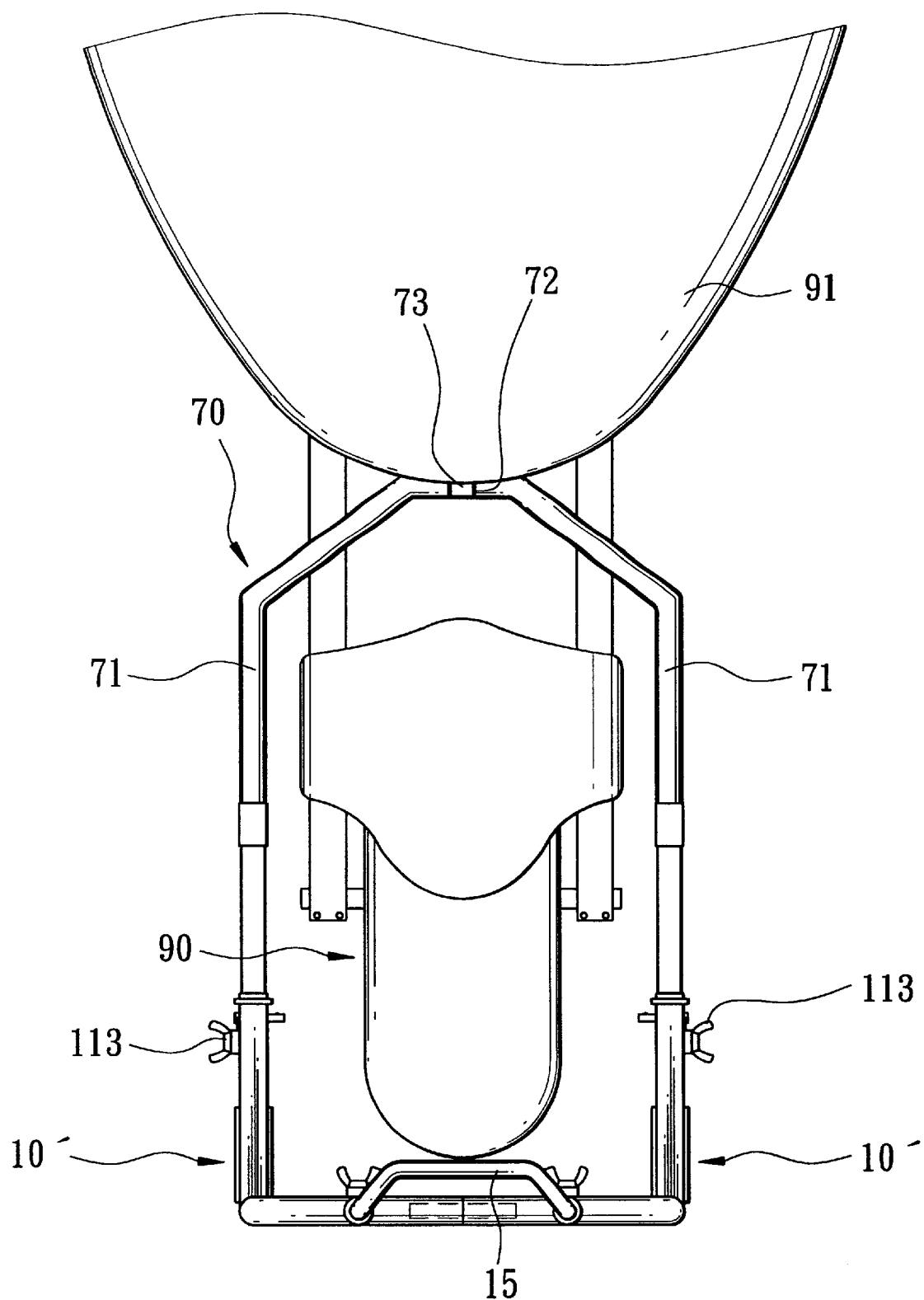
FIG. 10 is a schematic top view of the fourth preferred embodiment.

When it is necessary to lift a front wheel 90 (see FIGS. 9 and 10) of the motorcycle from the ground, the first replaceable assembly of the first preferred embodiment can be replaced with that shown in FIG. 8. Referring to FIGS. 8, 9, and 10, the replaceable assembly 70 includes two bent connecting rods 71, a generally cross-shaped coupler member 72, and a generally horizontal supporting rod 73. The connecting rods 71 are fixed to and extend upward from the vertical rods 20. The coupler member 72 has two aligned transverse horizontal insert rods 722 that extend respectively and integrally from two opposite sides thereof and away from each other and that are locked releaseably within tubular ends 710 of the connecting rods 71. Two lock pins 7222 extend through holes 711 in the connecting rods 71 and holes 7221 in the coupler member 72 so as to lock the coupler member 72 on the connecting rods 71. The supporting rod 73 extends through a longitudinally extending tubular portion 723 of the coupler member 72, and has a somewhat upwardly bent rear portion 731, which extends from the coupler member 72 and which is adapted to support a front end of a motorcycle frame 91.

With this invention thus explained, it is apparent that numerous modifications and variations can be made without departing the scope and spirit of this invention. It is therefore intended that this invention be limited only as indicated by the appended claims.

I claim:

1. A stand for supporting a motorcycle, the motorcycle having a front wheel, a rear wheel, a motorcycle frame having two aligned arms for supporting the rear wheel therebetween, and a horizontal hole unit extending through assembly of the arms and the rear wheel, said stand including a leverage base, a supporting unit, and a handle, said base including a pair of left and right frame units that are interconnected fixedly, each of said left and right frame units having a horizontal bottom frame with a front end and a rear end, and a post that is fixed on said base frame, said posts being adapted to be located on two sides of the rear wheel, said supporting unit being mounted fixedly between said posts so as to be adapted to support the rear wheel thereon and between said posts, thereby fixing the motorcycle relative to said stand, said handle being fixed to and extending rearward from said rear ends of said bottom frames, wherein the improvement comprises:

a pair of aligned vertical rods disposed respectively and telescopically on upper ends of said posts, said supporting unit being attached to said vertical rods;

means for positioning said vertical rods on said posts; and means for locking said vertical rods releaseably on said posts, wherein said rear end of each of said bottom frames is formed with a transverse tube, said base further including an insert rod, which has two ends that are press fitted within said transverse tubes.

2. The stand as claimed in claim 1, wherein each of said bottom frames further includes a longitudinal tube, which is formed integrally and perpendicularly with a respective one of said transverse tubes, said handle being formed integrally with two tubes, which are connected respectively and telescopically to said longitudinal tubes, said stand further including two lock bolts for locking said tubes of said handle on said longitudinal tubes, said longitudinal tubes defining a wheel-passing space therebetween, which is configured to be slightly wider than the rear wheel so as to guide the movement of the rear wheel between said frame units when said stand is adapted to be mounted under the rear wheel.

3. A stand for supporting a motorcycle, the motorcycle having a front wheel, a rear wheel, a motorcycle frame having two aligned arms for supporting the rear wheel therebetween, and a horizontal hole unit extending through assembly of the arms and the rear wheel, said stand including a leverage base, a supporting unit, and a handle, said base including a pair of left and right frame units that are interconnected fixedly, each of said left and right frame units having a horizontal bottom frame with a front end and a rear end, and a post that is fixed on said base frame, said posts being adapted to be located on two sides of the rear wheel, said supporting unit being mounted fixedly between said posts so as to be adapted to support the rear wheel thereon and between said posts, thereby fixing the motorcycle relative to said stand, said handle being fixed to and extending rearward from said rear ends of said bottom frames, wherein the improvement comprises:

a pair of aligned vertical rods disposed respectively and telescopically on upper ends of said posts, said supporting unit being attached to said vertical rods;

means for positioning said vertical rods on said posts; and means for locking said vertical rods releaseably on said posts, wherein each of said vertical rods is formed with an integral horizontal tube that has an open inner end, said supporting unit including:

two transverse rails disposed respectively and telescopically within said inner ends of said horizontal tubes;

means for locking said rails releaseably within said horizontal tubes;

two vertical plates connected respectively and fixedly to said rails and adapted to flank the rear wheel, each of said vertical plates having a plurality of rod holes formed therethrough;

a lock rod having a vertical rod portion and a horizontal rod portion, which is formed integrally with said vertical rod portion and which is adapted to extend through two of said rod holes in said vertical plates and the horizontal hole unit in the assembly of the arms and the rear wheel, thereby supporting the rear wheel on said lock rod; and a locking head locked releaseably on said horizontal rod portion of said lock rod so as to be adapted to confine the arms, the rear wheel, and said vertical plates between said locking head and said vertical rod portion of said lock rod.

4. A stand for supporting a motorcycle, the motorcycle having a front wheel, a rear wheel, a motorcycle frame having two aligned arms for supporting the rear wheel therebetween, and a horizontal hole unit extending through assembly of the arms and the rear wheel, said stand including a leverage base, a supporting unit, and a handle, said base including a pair of left and right frame units that are interconnected fixedly, each of said left and right frame units having a horizontal bottom frame with a front end and a rear end, and a post that is fixed on said base frame, said posts being adapted to be located on two sides of the rear wheel, said supporting unit being mounted fixedly between said posts so as to be adapted to support the rear wheel thereon and between said posts, thereby fixing the motorcycle relative to said stand, said handle being fixed to and extending rearward from said rear ends of said bottom frames, wherein the improvement comprises:

a pair of aligned vertical rods disposed respectively and telescopically on upper ends of said posts, said supporting unit being attached to said vertical rods;

means for positioning said vertical rods on said posts; and means for locking said vertical rods releaseably on said posts, wherein each of said vertical rods is formed with an integral horizontal tube that has an open inner end, said supporting unit including:

two transverse rails disposed respectively and telescopically within said inner ends of said horizontal tubes;

means for locking said rails releaseably within said horizontal tubes;

two vertical plates connected respectively and fixedly to said rails and adapted to flank the rear wheel, each of said vertical plates having a threaded hole; and two plastic supporting members, each of which includes a fixed threaded rod that engages threadably said threaded hole in a respective one of said vertical plates, and a supporting portion that is adapted to support a respective one of the arms and that is adapted to press against the rear wheel, thereby clamping the rear wheel between said supporting members.

5. A stand for supporting a motorcycle, the motorcycle having a front wheel, a rear wheel, a motorcycle frame having two aligned arms for supporting the rear wheel therebetween, and a horizontal hole unit extending through assembly of the arms and the rear wheel, said stand including a leverage base, a supporting unit, and a handle, said base including a pair of left and right frame units that are interconnected fixedly, each of said left and right frame units having a horizontal bottom frame with a front end and a rear end, and a post that is fixed on said base frame, said posts being adapted to be located on two sides of the rear wheel, said supporting unit being mounted fixedly between said posts so as to be adapted to support the rear wheel thereon and between said posts, thereby fixing the motorcycle relative to said stand, said handle being fixed to and extending rearward from said rear ends of said bottom frames, wherein the improvement comprises:

a pair of aligned vertical rods disposed respectively and telescopically on upper ends of said posts, said supporting unit being attached to said vertical rods;

means for positioning said vertical rods on said posts; and means for locking said vertical rods releaseably on said posts, wherein each of said vertical rods is formed with an integral horizontal tube that has an open inner end, said supporting unit including:

a transverse supporting rod having two narrowed end portions, and two distal ends that are locked releaseably within said horizontal tubes; and two plastic tubes sleeved fixedly on said narrowed end portions of said supporting rod and adapted to support the arms thereon.

6. A stand for supporting a motorcycle, the motorcycle having a front wheel, a rear wheel, and a motorcycle frame having a front end, on which the front wheel is mounted, said stand including a leverage base, a supporting unit, and a handle, said base including a pair of left and right frame units that are interconnected fixedly, each of said left and right frame units having a horizontal bottom frame with a front end and a rear end, and a post that is fixed on said base frame, said posts being adapted to be located on two sides of the front wheel, said supporting unit being mounted fixedly between said posts so as to be adapted to support the front wheel thereon and between said posts, thereby fixing the motorcycle relative to said stand, said handle being fixed to and extending forward from said front ends of said bottom frames, wherein the improvement comprises:

a pair of aligned vertical rods disposed respectively and telescopically on upper ends of said posts, said supporting unit being attached to said vertical rods, each of said vertical rods being formed with an upwardly extending connecting rod that is fixed thereto and that has a horizontal tubular end;

means for positioning said vertical rods on said posts; and means for locking said vertical rods releaseably on said posts;

said supporting unit including:

a coupler member having two aligned horizontal insert rods that extend respectively and integrally from two opposite sides thereof and away from each other and that are locked releaseably within said tubular ends of said connecting rods;

a generally horizontal supporting rod mounted removably on said coupler member and having a rear portion, which extends from said coupler member and which is adapted to support the front end of the motorcycle frame; and means for locking said supporting rod releaseably on said coupler member.

\* \* \* \* \*